2 Sheets—Sheet 1.

G. D. HAWORTH.
Corn-Planter.

No. 222,042. Patented Nov. 25, 1879.

WITNESSES
Franck L. Ouraud
Alex Mohen

INVENTOR
Geo. D. Haworth
by A. M. Smith
ATTORNEY

2 Sheets—Sheet 2.
G. D. HAWORTH.
Corn-Planter.
No. 222,042. Patented Nov. 25, 1879.
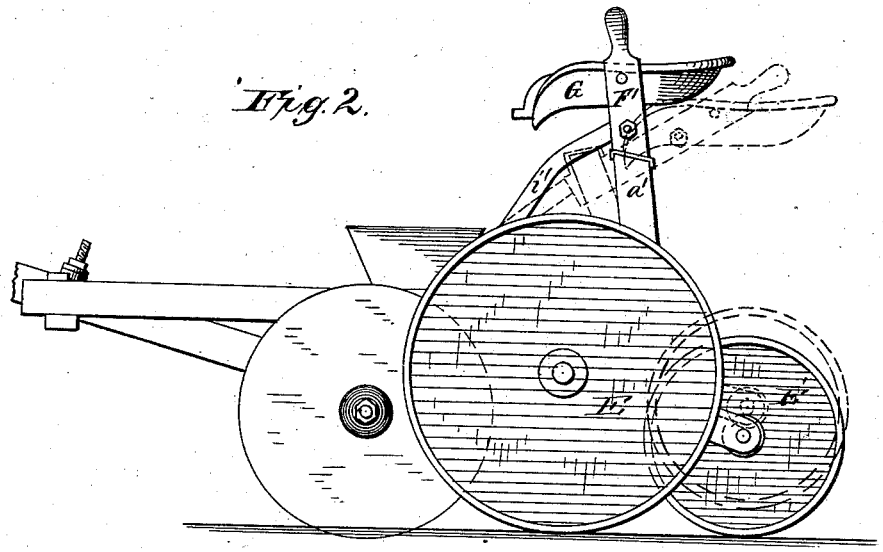
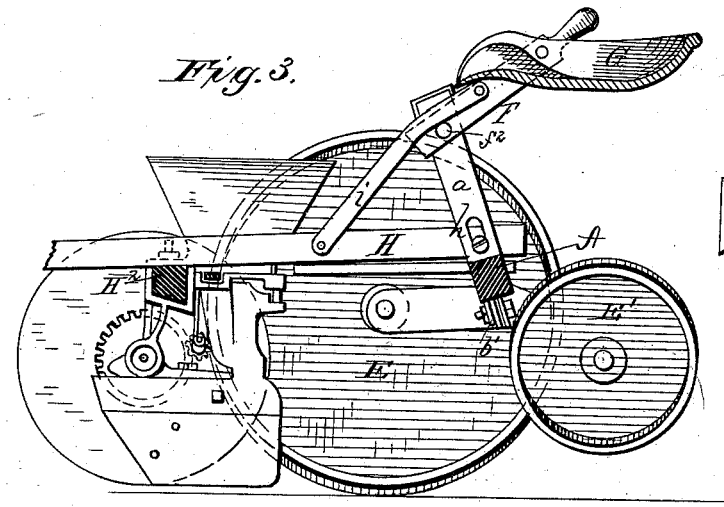 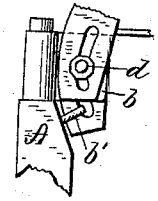
WITNESSES
INVENTOR

UNITED STATES PATENT OFFICE.

GEORGE D. HAWORTH, OF DECATUR, ILLINOIS.

IMPROVEMENT IN CORN-PLANTERS.

Specification forming part of Letters Patent No. 222,042, dated November 25, 1879; application filed September 29, 1879.

*To all whom it may concern:*

Be it known that I, GEORGE D. HAWORTH, of Decatur, county of Macon, State of Illinois, have invented certain new and useful Improvements in Corn-Planters, of which the following is a full, clear, and exact description, reference being had to the accompanying drawings, in which—

Figure 1:
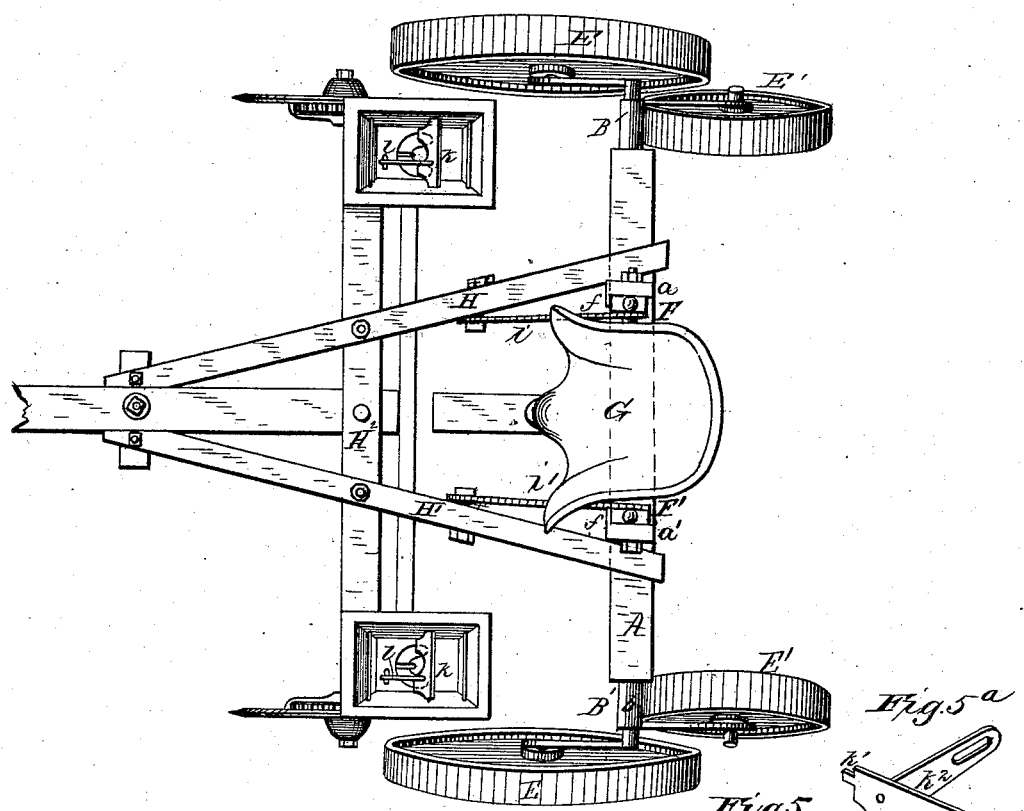
Figures 4, 5, 5A:
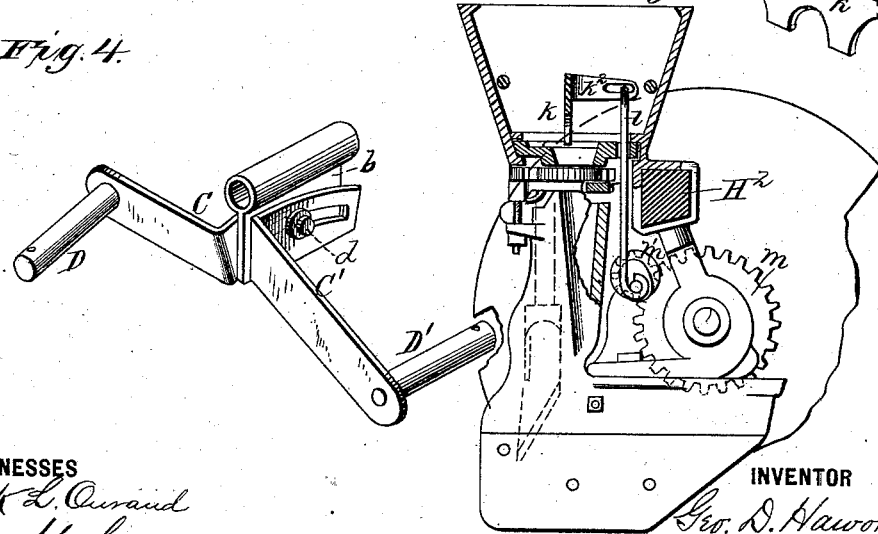

Figure 1 is a plan or top view of a machine embracing my improvements. Fig. 2 represents a side elevation of, and Fig. 3 a vertical longitudinal section through, the same. Fig. 4 is a perspective view of the sleeve and adjustable arms through which the ground and covering wheels are connected with the axle. Fig. 5 represents a vertical section through one of the hoppers, showing the shaker or stirrer and the arrangement of devices for operating the same; Fig. 5$^a$, a perspective view of the stirrer detached; and Fig. 6 is a detached view of one end of the axle, showing the axle sleeve and stop.

Similar letters of reference denote corresponding parts wherever used.

The invention relates, first, to a novel arrangement of the covering-wheels, adapting them to conform to the uneven surface of the ground and to press the soil evenly in on both sides of the furrow for covering the corn; secondly, to the means for raising the covering-rollers and seeding devices from the ground; and, thirdly, to a novel arrangement of shaker or feeding device.

The invention consists in the employment of covering-wheels arranged in pairs, one in advance of the other, and connected with the axle by pivotal arms, which permit them to vibrate on the axle as a center, to conform to the surface of the ground over which they are drawn; also, in making the arms through which the wheels are pivoted to the axle adjustable for changing the angle or pitch of the wheels, as hereinafter described.

It further consists in a novel arrangement of the seat-levers in connection with the main frame and rocking main axle, whereby the seeding devices and the covering-rollers can be raised clear of the ground and locked in that position, for facilitating the turning of corners or transportation, as hereinafter described.

In the accompanying drawings, A represents the main axle or axle-bar with which the ground and covering wheels are connected. This axle is made, by preference, rectangular in cross-section throughout the main portion of its length, having rounded journals at its ends for the reception of sleeves B B'. (See Figs. 1 and 4.) These sleeves are provided each with a pendent longitudinal rib or flange, $b$, forming a support for angular axle-arms C C', slotted in that portion or arm lying parallel with the rib $b$ for the reception of a through retaining bolt or bolts, as shown at $d$. The outer ends of these arms are bent one forward and the other backward at right angles or thereabout, as shown, and have stud-axles D D' secured to their ends, the forward one, D, projecting outward for the reception of the main ground and covering wheel E, and the rearwardly-projecting arm C', having an inwardly-projecting axle for the reception of the smaller covering-wheel, E', as shown. By this arrangement the two wheels are brought into close proximity, one slightly in rear of the other, and are connected by the same pivotal sleeve B with the main axle or axle-bar, one in front and the other in rear thereof; and the connection between the two wheels being rigid, as one wheel falls into a depression in the ground or rises to pass over an elevation or obstruction the other rises or falls to conform to the ground in its pathway, and both are thus made to press at all times with uniform weight on the ground.

By means of the slots and the retaining-bolts connecting the axle-arms with the sleeve B the axles can be set either in a horizontal position or inclining therefrom, according as it is desired to roll the soil level or into a ridge over the furrow.

Stops $b'$, attached to the axle-bar, limit the upward throw of wheels E, for turning at the end of rows, as hereinafter explained.

The axle-bar A has uprights $a\ a'$ connected rigidly with its upper face, to the upper ends of which the seat-levers F F', and to these, near their upper ends, the seat G, are pivoted, as shown.

The standards $a\ a'$ are provided, near their lower ends, with vertical slots or slotted plates, through which the rear ends of the hounds or timbers H H' of the seeding-frame are pivoted to them, as shown at $h$, Fig. 3.

Links $i$ $i'$ extend from a point in advance of the axle-bar A, and between said bar and the transverse frame-bar H² up to the seat-levers F F', midway of their length, as shown. The uprights $a$ $a'$ have stops at $f$ on their upper ends, which prevent the levers F from being thrown forward of a position parallel, or thereabout, with the uprights $a$; but said levers are free to move backward into the position shown in Fig. 3, or until the links $i$ $i'$ rest upon and are supported by stops $f^2$, which, in this instance, are extensions of the pivots connecting the levers F with the uprights $a$ $a'$. The levers are moved into this position to facilitate the turning of corners or the transportation of the machine from place to place, and act as follows: The pressing of the levers backward necessarily rocks the arms $a$ $a'$, and with them the axle-bar A, forward, and the axle-sleeves B being held by the stops $b'$ from rocking back beyond a certain point, the weight of the machine is thrown upon the main carrying-wheels E, while the wheels E' are raised clear of the ground, as shown in Fig. 3. By the same movement the links $i$ $i'$ are made to lift upon the rear ends of the frame-timbers H H', and the latter, acting through the tongue upon the neck-yoke, cause the seeding devices to be lifted clear of the ground, when the machine is free to be turned or moved, resting on the two main carrying-wheels E E only.

The seeding devices, except in particulars hereinafter described, are similar to those described in former patents.

The seed-hoppers and the revolving colters are arranged in advance of the covering-wheels, and are connected with the transverse frame-timber H², as described in said patents, or in any usual or preferred way. Each hopper is provided with a stirrer or shaker, $k$, made in the form of a pendent forked plate, (see Fig. 5$^a$,) provided near its upper edge with spurs or pivots $k'$, which are mounted in suitable bearing-sockets in the sides of the hopper. This plate has a horizontal arm, $k^2$, connected with it, and to the outer end of this arm a link, $l$, is attached, said link passing down through an eye or perforation in the hopper, and being connected at its opposite or lower end with a crank-pin on a gear-pinion, $m'$, meshing with and receiving motion from a spur-gear, $m$, attached to and moving with the revolving colter. By this arrangement a vibratory movement is imparted to the stirrer $k$ independent of the movement of the seed-slide, and the seed is thereby prevented from getting choked in the hopper, and is caused more readily to fill the measuring cups or chambers in said seed-slide.

Where runners are used instead of the revolving colters, the stirrers may be connected with and operated in a similar manner from the covering-wheels.

Having now described my invention, I claim—

1. The main carrying and covering wheels mounted upon arms having a pivotal connection with the main frame or axle, in combination with supplemental covering-wheels, or their equivalent, connected therewith, and operating substantially as described.

2. The supplemental covering-wheel having an eccentric arrangement to the main carrying and covering wheels, and connected with the main frame or axle through the medium of the same pivotal arm which connects said main wheel therewith, for the purpose and substantially as described.

3. The covering-wheels connected with the axle-bar by adjustable arms, adapting them to be set at different angles of presentation to the ground.

4. The adjustable arms, in combination with the pivotal sleeves for connecting the covering-wheels with the axle or axle-bar, substantially as described.

5. The rocking axle-bar, in combination with the covering-wheels having a pivotal connection with said bar, substantially as described.

6. The combination of the seeder-frame with the rocking axle having the rigid uprights and the pivoted seat-levers, arranged and operating substantially as described.

7. The rocking axle, in combination with the pivoted covering-wheels and the seeder-frame applied thereto, substantially as described, whereby the rear covering-wheels and the seeding devices can be raised clear of the ground by one and the same movement of the rocking axle, substantially as and for the purpose set forth.

GEO. D. HAWORTH.

Witnesses:
J. H. LEWIS,
IRA B. CURTIS.